UNITED STATES PATENT OFFICE 2,468,523

DELAYED-ACTION POLYMERIZATION PROCESS

Robert M. Thomas, Union, David W. Young, Roselle, and John D. Calfee, Cranford, N. J., assignors to Standard Oil Development Company, a corporation of Delaware No Drawing. Application June 10, 1943, Serial No. 490,280

8 Claims. (Cl. 260—93)

This invention relates to polymerization processes, relates particularly to low temperature polymerization processes and catalysts for olefinic material, and relates especially to a slow, controlled, low temperature polymerization process for olefinic materials for obtaining polymers which are curable into synthetic rubber material of moderately high modulus.

It has been found possible to polymerize mixtures of an isoolefin such as isobutylene with a polyolefin such as butadiene or isoprene or dimethallyl or myrcene, or the like at temperatures ranging from 0° C. or —20° C., —40° C. to —160° C. into high-grade synthetic substitute rubbers, by the application thereto of a dissolved Friedel-Crafts catalyst. The resulting polymers cure readily with sulfur and other curing agents into materials of good strength, good elongation, good flexure and abrasure resistance but as a general rule with relatively low modulus. The previously used ordinary Friedel-Crafts active metal halide type catalysts are, however, extremely rapid in action and require elaborate mixing and stirring machinery to obtain a proper polymerization procedure with adequate mixing of the catalyst into the olefinic material, and even with the best of equipment, it is extremely difficult to avoid the development of "hot spots" in the material with the unavoidable development of portions of polymer of undesirably low molecular weight resulting therefrom.

The present invention provides a slow acting catalyst and a process for the polymerization of olefinic mixtures by which the olefins, a suitable refrigerant, and the catalyst are mixed in a suitable container during an induction period by the use of relatively very light mixing equipment to obtain a thoroughly homogeneous reaction mixture of olefin, refrigerant and catalyst in which the reaction occurs quite slowly in the absence of any stirring, to yield a polymer having a very narrow range of molecular weights, as determined by standard cloud point or non solvent experiments, solubility tests, and viscosity determinations according to the Staudinger method; in a reaction which is readily controlled and free from "hot spots" and polymerization irregularities; to yield a polymer which, when cured, has a much higher modulus than is characteristic of any of the previous low temperature olefinic polymers. In addition the reaction may be triggered off after the mixing is complete by the utilization of appropriate triggering catalysts to utilize the delayed action properties of the slow acting catalyst to permit the preparation of a very good homogeneous mixture and then speed up the reaction to shorten the time required without sacrifice of the relatively much higher modulus of the resulting polymer when cured.

Thus the process of the present invention polymerizes an olefinic material after a substantial time delay sufficient to permit thorough mixing of olefins, refrigerant and catalyst to yield a polymer which is curable to a much higher modulus, with or without a polymerization initiating reaction. Other objects and details of the invention will be apparent from the following description:

Broadly, the present invention utilizes a slow acting Friedel-Crafts catalyst such as a mixture of aluminum bromide with aluminyl bromide (AlBr₃.AlOBr), the relative proportions of the aluminum halide and aluminyl halide being varied according to the speed of the reaction desired.

It may be noted that aluminum bromide dissolved in an appropriate solvent is a relatively slow catalyst, which, in appropriate concentration in the solvent, tends to produce a good polymer even though the reaction may take many minutes or hours. However, the aluminum bromide may be modified in many ways by the production of various types of hydrated compounds or double salts, which, depending upon the modifier chosen, may increase by a desired amount the rate of reaction or may decrease the rate of reaction or may modify the character of polymer obtained. Likewise, the solvent used very greatly modifies the speed of reaction. When the solvent used is a simple, low-boiling hydrocarbon, the reaction, especially when the catalyst solution is of relatively low concentration, is quite slow, requiring hours to days as the time in which to go to even approximate completion. Alternatively, the alkyl halides as catalyst solvents substantially increase the speed of the reaction. Of the many useful Friedel-Crafts halides, aluminum chloride dissolved in ethyl or methyl chloride, gives probably the most rapid reaction, which, under these circumstances, may be practically instantaneous. However, by modification of the aluminum chloride, or by the use of other Friedel-Crafts catalysts, modified similarly if desired, the desired slowness of reaction may be obtained. Particularly, the presence of the oxygenated Friedel-Crafts halides modifies the speed of the reaction; the addition of the aluminyl type, especially with the bromide, and with other Friedel-Crafts metals than aluminum, markedly reduces the speed of the reaction. Accordingly, it is within the scope of the present invention to utilize a wide range of Friedel-Crafts halide substances in solution in appropriate solvents (if desired) with modifications of the solvent or the Friedel-Crafts halide to slow down the reaction speed. The preferred solvents are the lower hydrocarbons, especially those having less than 7 carbon atoms per molecule and freezing points below about 0° C. and preferably paraffin hydrocarbons having 3 to 5 carbon atoms per molecule. In addition, various of the alkyl halides, either alone or in various types of mixtures are suitable solvents, and a wide range of Friedel-Crafts halides may be used, as such, or modified to improve their solubility, when dissolved in these solvents to serve as slow reacting catalysts.

The reaction mixture conveniently consists of an isoolefin which preferably is isobutylene but may be other of the low molecular weight isoolefins such as 2 methyl butene 1 or 2 ethyl butene 1, or the like. The isoolefin may be used alone, or may be mixed with a polyolefin such as butadiene or isoprene or piperylene or dimethyl butadiene or dimethallyl, or myrcene, or the like, the usable diolefins ranging in carbon, number however, from 4 to about 12 or 14, being either conjugated or non-conjugated and having 2, 3 or more double linkages in the molecule. The isoolefin and the polyolefin are preferably mixed with a major proportion of the isoolefin and a minor proportoin of the diolefin. With butadiene, a convenient mixture consists of 70 parts of isobutylene with 30 parts of butadiene. With isoprene, the proportion preferably ranges between 90 parts of isobutylene with 10 parts if isoprene to 99.5 parts of isobutylene with 0.5 parts of isoprene. Most of the other polyolefins are preferably used in proportion ranges between these values, although in some instances mixtures of approximately equal parts are useful. The olefinic mixture may be diluted with a diluent or diluent-refrigerant or may be used undiluted. If it is diluted, convenient diluents are ethylene, ethane, propane or butane or the like. For diluent-refrigerants, liquid ethylene is the preferred material, although liquid propane is also usable and liquid ethane and liquid methane are likewise usable.

As a simple refrigerant, carbon dioxide may be used either in the solid form or as a liquid dissolved in the reaction mixture, in either instance the resulting temperature being approximately —78° C. Alternatively, the olefinic reaction mixture either with or without a diluent may be cooled by an external refrigerant to the desired temperature which preferably lies between —70° C. and —125° C. For external refrigerant, in a refrigerating jacket, practically any of the refrigerating materials are usable.

The desired reaction mixture is conveniently prepared, merely by putting the various components together in a suitable container. The mixture is desirably stirred, for which purpose a relatively light stirring equipment is satisfactory, a small portable propeller type stirrer being entirely suitable. Preferably, but not necessarily, when the components of the reaction mixture are all in the reactor, the catalyst is added. The catalyst preferably consists of a solution of a Friedel-Crafts halide admixed with an oxygenated Friedel-Crafts halide, the admixture being dissolved in a suitable solvent. The preferred catalyst is a mixture of aluminum bromide with aluminyl bromide, in solution in propane or butane or even pentane, although it may also be dissolved in such solvents as any of the low freezing alkyl halides having freezing points below about 0° C. or in carbon disulfide, or the like. However, in the alkyl halides the catalyst is much more rapid in its action than when used in a pure hydrocarbon. To obtain yields of 80% polymer at temperatures of —78° C. the result is obtained in about three minutes with the $AlBr_3 \cdot XAlOBr$ catalyst in $CH_3Cl$. However, when the catalyst is used in propane the reaction time for an 80% yield, at —78° C. is always greater than about ½ hour.

The catalyst solution may contain from 0.15% to approximately 8, 10 or 12% of the dissolved solid catalyst. The catalyst solution as so prepared is added to the olefinic mixture in the reactor and stirred in by the use of the same stirring equipment. The amount of catalyst may range from 1 part to 50 parts per 100 parts of olefinic material depending upon the catalyst used and the concentration of the catalyst solution. The catalyst solution is then thoroughly stirred into the reaction mixture and the stirring equipment may, if desired, then be removed. The polymerization reaction begins after a time delay which may range from a minute or two to an hour or two or even a day, depending upon the catalyst chosen, and so forth. The polymerization proceeds at a leisurely pace and may eventually reach a stage where approximately all of the olefinic material is polymerized into a high molecular weight polymer.

The amount of diluent or diluent-refrigerant or both may range from none to 300, 400 or even 700 parts per 100 parts of mixed olefins. When a diluent is used with agitation the olefin polymer forms slowly as an emulsion and it is very easy to dump the free flowing polymer material with diluent from the reactor. It has been found that care must be used in the purification of the hydrocarbon diluent or refrigerant (such as ethylene, ethane, or propane) when it is used as an internal diluent for the polymerization reaction. Otherwise, the impurities introduced into the reaction, such as sulfur compound, alcohols, etc., will reduce the molecular weight of the polymer.

Experimental work has also demonstrated that the aluminyl bromide catalysts are slower in their rate of polymerization of olefins as the temperature is reduced.

The catalyst material may be practically any of the brominated hydrocarbon soluble Friedel-Craft catalysts, as shown by N. O. Calloway in his article on the "Friedel-Craft Synthesis," printed in the issue of "Chemical Reviews," published for the American Chemical Society at Baltimore in 1935, in volume XVII, No. 3, the article beginning on page 327, the list being particularly well shown on page 375, practically any of these catalysts being capable of conversion into an oxygenated halide in admixture with the normal halide to yield a slow acting catalyst, although this effect is far less pronounced with aluminum chloride than with any of the other Friedel-Crafts catalysts.

Commercially, it is of course undesirable for a reaction to require many hours or days unless some product is obtained which is unique, and obtainable in no other manner. In the present instance all of the advantages of the slow polymerization at low temperature of the olefinic material including the simplicity of mixing and the advantageous modulus may be obtained in a short time by the additional step of triggering off a rapid polymerization reaction after the material for the slow reaction is fully prepared. For this purpose the olefinic reaction mixture with a slow acting catalyst is prepared as above described, and at some convenient time after the completion of the mixing step, when the olefinic material and slow acting catalyst are fully mixed and the reaction under way, it may be caused to occur quickly by the unexpected and unique property of being "triggered off," or having a rapid polymerization reaction initiated by the addition of a small amount of auxiliary, quick-acting triggering catalyst. For this purpose a small quantity of a solution of aluminum chloride or titanium tetrachloride in solution in ethyl or methyl chloride or carbon disulfide or the like may be used. The triggering catalyst is added while the feed is active. However, it is desirable to add the triggering catalyst before about 1 to 5% of solid polymer has formed. It is found that when the slow acting catalyst is fully admixed with the olefinic material a very small amount of said triggering catalyst starts the reaction at a high speed and it is complete in a few seconds or minutes, where otherwise it would not be complete for many hours or days. For this purpose the amount of triggering catalyst required may range from a fraction of 1%, up to 10% of the amount which would be required if the triggering catalyst only were used, showing that once rapid polymerization reaction is started, the slow acting catalyst is capable of carrying it through to the desired stage.

In the initiated reaction, if it is desired to carry the reaction to substantial completion, an amount of the slow acting catalyst is utilized which is sufficient to carry the reaction to completion and a minor excess only is conveniently added. On the addition of the triggering catalyst, the reaction goes quickly to completion; in this instance also, yielding a polymer having a very narrow range of molecular weight. Alternatively, if it is desired to arrest the reaction short of 100% polymerization of the olefinic material, a limited amount only of the slow catalyst is used, the amount being such that the total amount of slow acting and triggering catalyst is sufficient only to carry the reaction to the desired percentage utilization. In this instance to avoid the production of undesired low polymers, it is preferable to dump the reaction mixture into a catalyst destroying material such as the warm water, soda solution, and the like, above mentioned, as soon as the reaction shows signs of slowing down. For the slow acting catalyst, any of the above mentioned Friedel-Crafts oxyhalide catalysts that are soluble in hydrocarbons may be used. For the triggering catalyst a considerable range of materials is available, aside from the Friedel-Crafts catalyst as such, including most of the common acids, such as formic acid, and also various of the other Friedel-Crafts catalysts including boron trifluoride either in gaseous form or in solution in ethyl or methyl chloride of the like.

The examples herein presented are intended to show the ultimate details of the invention, not as limiting the scope of the invention made, and the product obtained is described as a rubbery material, which phrase is intended to mean a material which has the property of elongation which has the characteristic of natural rubber, either before or after curing.

*Example 1*

A mixture was prepared consisting of 1000 parts by weight of liquid isobutylene with 200 parts by weight of solid $CO_2$. Simultaneously a solution was prepared consisting of 2½ parts by weight of a double salt of aluminum bromide with carbon tetrabromide in 500 parts by weight of pure butane. The mixture was stirred until the liquid portion was homogeneous and the mixture was allowed to stand with occasional replenishment of the solid carbon dioxide. After five hours, no polymerization had occurred. After 22 hours, the formation of precipitated solid polymer was evident. At the end of 36 hours, approximately 74% of the isobutylene had polymerized. A portion of solid polymer removed at this stage was found to have a molecular weight of approximately 66,000 and the polymerization eventually continued to completion after about 50 hours.

*Example 2*

A mixture was prepared consisting of 985.5 parts by weight of isobutylene of approximately 98% purity with 14.5 parts by weight of isoprene of about 76% purity. To this mixture was added approximately 200 parts by weight of solid $CO_2$. Simultaneously 3 parts by weight of the double salt aluminum bromide with aluminum hydroxy bromide ($AlBr_2OH.2AlBr_3$) was dissolved in approximately 500 parts by weight of pure butane. The catalyst solution was added to the olefinic reaction mixture and stirred to homogeneity of the liquid portion. No visible polymer formed during the first three hours. After 17 hours, a trace of precipitated solid polymer was visible, and after 26 hours approximately 42% by weight of the olefinic mixture was polymerized to solid precipitated polymer. As before, the supply of solid $CO_2$ was replenished from time to time. The solid polymer was removed and washed in warm water. It was found to have a molecular weight of approximately 32,000 and an iodine number of approximately 1.

This material was compounded according to the following recipe:

| | Parts |
|---|---|
| Polymer | 100 |
| Cabot #9 carbon black | 50 |
| Stearic acid | 5 |
| Zinc oxide | 3 |
| Sulfur | 3 |
| Tuads (tetra methyl thiuram disulfide) | 1 |

The mixing was conducted on the open roll mill and the material was placed in molds and cured at a temperature of approximately 137° C. for a time interval of approximately 30 minutes. The cured material was found to have a tensile strength of approximately 2200 pounds per square inch, an elongation at break of approximately 700%, and a modulus of approximately 900. (The modulus is measured as the pounds per square inch pull required to stretch a standard test sample to 3 times its original length.)

These properties show that the material is a high-grade synthetic rubbery material suitable for many commercial structural purposes.

*Example 3*

A similar mixture was prepared consisting of 985.5 parts by weight of isobutylene with 14.5 parts by weight of isoprene. This material was placed in a reactor with approximately 200 parts by weight of solid $CO_2$, and stirred to homogeneity by a light circulating stirrer. To this olefinic mixture there was then added a solution consisting of 500 parts by weight of pure butane with 3 parts by weight of the hydrated aluminum bromide or the double salt of aluminum hydroxy bromide with aluminum bromide $$(AlBr_2OH.AlBr_3)$$

At the end of two hours no solid polymer had formed, but after 6 hours approximately 78% of the olefinic material had been converted to solid precipitated polymer. The polymer was washed with warm water and the molecular weight was found to be approximately 43,000.

The polymer was compounded according to the recipe shown in Example 2 and cured at 137° C. for 30 minutes. The cured polymer was found to have a tensile strength of 2960 pounds per square inch with a modulus of 1230 pounds per square inch at 300% elongation. These values show the material to be a high-grade synthetic rubbery material with an excellent tensile strength and a relatively high modulus.

Example 4

A mixture was prepared consisting of 1000 parts by weight of isobutylene of approximately 98% purity with 200 parts by weight of solid $CO_2$. To this material there was then added a catalyst solution consisting of approximately 500 parts by weight of pure butane containing in solution 4.2 parts by weight of the double salt of aluminum bromide with aluminyl bromide $(AlBr_3.AlOBr)$. No solid polymer was visible in the reaction mixture at the end of 5 minutes but at the end of 40 minutes approximately 79% of the isobutylene present had polymerized into a polymer having a molecular weight of approximately 65,500.

Example 5

Approximately 1000 parts by weight of isobutylene was mixed with approximately 200 parts by weight of solid $CO_2$ and to the mixture there was added a catalyst solution consisting of approximately 500 parts by weight of liquid ethane, containing in solution approximately 1.7 parts by weight of titanium bromide formate ($TiBr_3$ formate). No solid polymer was visible at the end of 30 seconds but after approximately 12 minutes, 67% by weight of the isobutylene had polymerized into a solid polymer. The material was washed with warm water and the molecular weight was found to be 79,600 by the Staudinger method. The polymer was found to be "dry" and free from light hydrocarbons or low molecular weight polymers such as dimer and trimer and with an unusually narrow range of molecular weight.

Example 6

Approximately 1000 parts by weight of isobutylene was mixed with 200 parts by weight of solid $CO_2$. To this mixture there was then added a catalyst consisting of approximately 500 parts by weight of pure butane containing in solution approximately 1.75 parts by weight of aluminyl bromide-aluminum bromide-hydrated aluminum bromide $(AlBr_3.AlBr_2OH.AlOBr)$. After 5 minutes a trace of polymer had formed and precipitated. After 12 minutes approximately 10% of the isobutylene had polymerized as solid precipitated polymer; and after 40 minutes, approximately 45% of the isobutylene had polymerized and precipitated. The polymer was washed with water and the molecular weight determined to be approximately 57,300.

Example 7

A mixture was prepared consisting of approximately 400 parts by weight of isobutylene with 800 parts by weight of liquid propane. This mixture was cooled externally by liquid ethylene to a temperature of approximately −100 to −103° C. A catalyst consisting of 150 parts by weight of a saturated solution of aluminum bromide with aluminum oxy bromide was added to the reaction mixture. This solution contained approximately 1.5 grams of the double salt $$(AlOBr.4AlBr_3)$$

in the catalyst solution. A small amount of polymer formed and precipitated at the margins of the solution on the reactor wall but the body of the solution remained clear. At the end of 5 minutes, when the polymer solution, the isobutylene and the propane were thoroughly mixed and in the form of a homogeneous solution, 60 parts by weight of a methyl chloride solution containing 0.05% of the double salt of aluminum chloride with aluminyl chloride $(AlOCl.2AlCl_3)$ was added. Polymerization began immediately and continued at a very rapid rate, reaching completion in about one minute. The yield was approximately 100% of the isobutylene added and after warming up to room temperature and washing in water, the polymer was found to have a molecular weight of approximately 100,000.

Example 8

A mixture was prepared consisting of approximately 970 parts by weight of isobutylene of 98% purity with 30 parts by weight of isoprene of approximately 96% purity. The mixture was placed in the reactor together with approximately 500 parts by weight of crushed solid carbon dioxide. The mixture was stirred while a catalyst consisting of 200 parts by weight of a saturated solution of aluminyl bromide with aluminum bromide $(AlOBr.4AlBr_3)$ in boiling propane was added and well stirred in. At the end of five minutes, the olefinic mixture was slightly milky, indicating the formation of minor quantities of polymer. At this point, 100 parts by weight of a methyl chloride solution containing 0.1% of aluminum chloride was added as an initiator or trigger catalyst. Polymerization began immediately and proceeded rapidly to yield a quantity of solid polymer approximately 50% of the amount of olefinic material in the original mixture. At this point the mass of material was dumped into warm water to destroy the catalyst and drive off the unreacted materials.

The resulting polymer was found to have a molecular weight of approximately 45,000. The polymer was compounded according to the recipe given in Example 2 with the further addition of 50 parts of carbon black (Cabot #9). The compounded polymer was cured at a temperature of 137° C. for a time interval of approximately 30 minutes and was found to have a tensile strength ranging from 2050 to 2100 pounds per square inch with an elongation at break ranging from 500% to 670% of its original length, with a modulus ranging from 700 to 1150, as shown in the following table:

Mooney plasticity (pure gum) 50:
    Modulus (300%)-tensile-elongation for 20' cure _____ 700–2050–670
    Modulus (300%)-tensile-elongation for 60' cure _____ 1150–2100–500

Example 9

A mixture was prepared consisting of approximately 100 parts by weight of isobutylene of approximately 96% purity and 300 parts by weight of 95% ethane. The mixture was placed in the reactor and 10 parts by weight of catalyst solution was added at —78°. The solvent for the catalyst [(AlBr₃)₄.AlOBr] was C. P. butane. Concentration of catalyst in butane was 0.47 g./100 ml. After 20 minutes the yield of polymer was 83% and the M wt. of the polybutene was found to be 57,000.

*Example 10*

A mixture was prepared consisting of approximately 100 parts by weight of isobutylene of approximately 96% purity and 300 parts by weight of 95% ethane. The mixture at —90° was placed in the reactor and 10 parts by weight of the same catalyst as used in Example 9 was added. After the catalyst had been added 0.01% of C. P. formic acid was placed in the reactor. The formic acid was added as a liquid to the feed. After about 1 second the polymerization reaction started and in 15 seconds the yield of product was 92% and the M wt. of the polybutene was found to be about 48,000.

*Example 11*

A mixture was prepared consisting of 960 parts of isobutylene with 40 parts of butadiene and this mixture was cooled to a temperature of approximately —78° C. by the addition thereto of approximately 3000 parts by weight of powdered solid carbon dioxide. A catalyst was prepared by dissolving approximately one part of anhydrous aluminum bromide in 100 parts of butane and this amount, 100 parts of butane, catalyst solution was added to the 1000 parts of mixed olefins through a small jet under a few pounds pressure, the addition of the catalyst occupying a time interval of approximately 5 minutes. No formation of polymer was observed during the addition of the catalyst. The visible polymerization reaction began, however, within approximately ten minutes and continued over a period of several hours, at the end of which time approximately 62% conversion of the olefinic material was obtained. The polymer was removed from the reactor, washed with water to remove as much as possible of the catalyst and volatilize the residual unpolymerized material and was then compounded according to the recipe in Example 2. As so compounded, the stock was found to have a tensile strength of 2050 pounds per square inch and an exceptionally high modulus at 300% elongation.

Thus the process of the invention provides means for conducting the polymerization reaction at low temperature of olefinic materials by the utilization of an induction period during which the catalyst is stirred homogeneously into the reaction mixture and the actual polymerization conducted in the presence of negligible amounts of stirring during the passage of a substantial length of time, or by the addition of a triggering or initiating catalyst as a secondary catalyst.

While there are above disclosed but a limited number of embodiments of the device of the invention, it is possible to produce still other embodiments without departing from the inventive concept herein disclosed and it is therefore desired that only such limitations be imposed on the appended claims as are stated therein or required by the prior art.

The invention claimed is:
1. A polymerization process comprising the steps in combination of cooling an olefinic material comprising a major proportion of isobutylene mixed with a minor proportion of a polyolefin having 4 to 14, inclusive, carbon atoms per molecule to a temperature between —40° C. and —160° C., stirring into the olefinic material a substantial quantity of a polymerization catalyst comprising a double salt of aluminum bromide and aluminyl bromide in solution in butane during an induction period, and thereafter adding to the olefin-containing mixture a triggering catalyst comprising a portion of aluminum chloride in solution in ethyl chloride.

2. A polymerization process comprising the steps in combination of cooling an olefinic material comprising a major proportion of isobutylene mixed with a minor proportion of butadiene to a temperature between —40° C. and —160° C., stirring into the olefinic material a substantial quantity of a polymerization catalyst comprising a double salt of aluminum bromide and aluminyl bromide in solution in butane during an induction period, and thereafter adding to the olefin-containing mixture a triggering catalyst comprising a portion of aluminum chloride in solution in ethyl chloride.

3. A polymerization process comprising the steps in combination of cooling an olefinic material comprising a major proportion of isobutylene mixed with a minor proportion of isoprene to a temperature between —40° C. and —160° C., stirring into the olefinic material a substantial quantity of a polymerization catalyst comprising a double salt of aluminum bromide and aluminyl bromide in solution in butane during an induction period, and thereafter adding to the olefin-containing mixture a triggering catalyst comprising a portion of aluminum chloride in solution in ethyl chloride.

4. A polymerization process comprising the steps in combination of cooling an olefinic material comprising a major proportion of isobutylene mixed with a minor proportion of dimethyl butadiene to a temperature between —40° C. and —160° C., stirring into the olefinic material a substantial quantity of a polymerization catalyst comprising a double salt of aluminum bromide and aluminyl bromide in solution in butane during an induction period, and thereafter adding to the olefin-containing mixture a triggering catalyst comprising a portion of aluminum chloride in solution in ethyl chloride.

5. A polymerization process comprising the steps in combination of cooling an olefinic material comprising isobutylene to a temperature below —40° C., stirring into the olefinic material a substantial quantity of a delayed action catalyst comprising aluminum bromide dissolved in a paraffin hydrocarbon having 3 to 5 carbon atoms per molecule, and adding to the resulting homogeneous mixture a supplemental minor quantity of a solution of aluminum chloride in an alkyl halide having 1 to 2 carbon atoms per molecule.

6. A polymerization process comprising the steps in combination of cooling an olefinic material comprising a mixture of a major proportion of isobutylene with a minor proportion of a polyolefin having 4 to 14 carbon atoms per molecule to a temperature below —40° C., stirring into the olefinic material a substantial quantity of a delayed action catalyst comprising aluminum bromide dissolved in a paraffin hydrocarbon having 3 to 5 carbon atoms per molecule, and thereafter adding to the resulting olefin-containing mixture a triggering catalyst comprising a Friedel-Crafts halide in an alkyl halide having 1 to 2 carbon atoms per molecule.

7. A polymerization process comprising the steps in combination of cooling an olefinic material comprising isobutylene to a temperature below 0° C., stirring into the olefinic material a substantial quantity of a delayed action catalyst comprising a solution of aluminum bromide in butane, and thereafter adding to the resulting homogeneous mixture a supplemental minor quantity of a triggering catalyst consisting of aluminum chloride dissolved in methyl chloride.

8. A polymerization process comprising the steps in combination of cooling an isobutylene-containing olefinic material to a temperature below 0° C., stirring into the olefinic material a substantial quantity of a delayed action catalyst solution consisting essentially of a solution of Friedel-Crafts catalyst in a paraffin hydrocarbon having 3 to 5 carbon atoms per molecule, and thereafter adding to the resulting olefin-containing mixture, a triggering catalyst consisting essentially of a Friedel-Crafts catalyst dissolved in a low freezing, non-complex forming alkyl halide.

ROBERT M. THOMAS.
DAVID W. YOUNG.
JOHN D. CALFEE.

REFERENCES CITED

The following references are of record in the file of this patent:

UNITED STATES PATENTS

| Number | Name | Date |
|---|---|---|
| 2,142,980 | Huijser | Jan. 3, 1939 |
| 2,387,784 | Thomas et al. | Oct. 20, 1945 |

FOREIGN PATENTS

| Number | Country | Date |
|---|---|---|
| 505,736 | Great Britain | May 16, 1939 |
| 525,542 | Great Britain | Aug. 30, 1940 |